United States Patent [19]

Schumann

[11] Patent Number: 4,721,624
[45] Date of Patent: Jan. 26, 1988

[54] PROCESS FOR REMOVING HARMFUL RESIDUES FROM FOOD DURING COOKING

[75] Inventor: Franz W. Schumann, Bad Nauheim, Fed. Rep. of Germany

[73] Assignee: FIBEG Beteiligungesellschaft mbH, Idar-Oberstein, Fed. Rep. of Germany

[21] Appl. No.: 791,567

[22] Filed: Oct. 25, 1985

Related U.S. Application Data

[63] Continuation of Ser. No. 532,052, Sep. 14, 1983, abandoned.

[30] Foreign Application Priority Data

Oct. 5, 1982 [DE] Fed. Rep. of Germany ....... 3236784

[51] Int. Cl.⁴ .......................... A23L 1/01; A23L 1/00
[52] U.S. Cl. ........................................ 426/286; 99/352; 210/282; 210/455; 210/482; 210/475; 210/477; 426/523; 426/271; 426/422; 426/509
[58] Field of Search ............... 426/495, 509, 523, 271, 426/132, 433, 84, 422, 423, 431; 210/282, 251, 455, 470, 482, 473–477; 99/352

[56] References Cited

U.S. PATENT DOCUMENTS

| | | | |
|---|---|---|---|
| 702,525 | 6/1902 | Arner et al. | 210/282 |
| 818,478 | 4/1906 | Shwayder | 426/422 |
| 1,834,045 | 12/1931 | Breuil | 210/282 |
| 1,976,091 | 10/1934 | Pritchett | 426/422 |
| 1,984,047 | 12/1934 | Thieme | 210/282 |
| 2,084,056 | 6/1937 | Costello | 426/422 |
| 2,108,661 | 2/1938 | Farrier et al. | 426/422 |
| 2,203,229 | 6/1940 | Nilsson et al. | 426/422 |
| 2,335,657 | 11/1943 | Eweson | 210/282 |
| 2,749,307 | 6/1956 | Ellison | 210/282 |
| 3,206,031 | 9/1965 | Messa | 210/482 |
| 3,220,555 | 11/1965 | Silha | 210/282 |
| 3,392,837 | 7/1968 | Sanzenbacher | 210/282 |
| 3,436,345 | 4/1969 | Goodenough et al. | 210/282 |
| 3,852,490 | 12/1974 | Kohn | 426/495 |
| 4,134,831 | 1/1979 | Dawson et al. | 210/692 |
| 4,274,968 | 6/1981 | Grutsch et al. | 210/694 |
| 4,276,179 | 6/1981 | Soehngen | 210/692 |

FOREIGN PATENT DOCUMENTS

| | | | |
|---|---|---|---|
| 555581 | 4/1958 | Canada | 210/282 |
| 493539 | 1/1937 | United Kingdom | 210/282 |

OTHER PUBLICATIONS

The Poisons in Your Food, pp. 212–215, William Longgood Pyramid Books 1970.
Nutrition: Concepts & Controversies, 1979 West Publ. Co., pp. 342–349.
Lets Eat Right to Keep Fit, 1970, A. Davis, Signet Book.

Primary Examiner—Steven Weinstein
Attorney, Agent, or Firm—Breneman, Georges, Hellwege & Yee

[57] ABSTRACT

The invention relates to a cooking utensil, for example a cooking pot, wherein the latter has an ion exchanger and/or absorber and/or adsorber and/or filter and/or other device for the extraction of residues of pesticides, herbicides, synthetic fertilizers, hormones and the like from the products to be cooked and prepared, i.e. from the foodstuffs to be prepared, their preparation liquid and/or their vapors during the cooking process. The said harmful substances are to be extracted in this way from the products to be cooked.

2 Claims, 10 Drawing Figures

PROCESS FOR REMOVING HARMFUL RESIDUES FROM FOOD DURING COOKING

This application is a continuation of application Ser. No. 532,52, filed Sept. 14, 1983, now abandoned.

The invention relates to a cooking utensil, for example a cooking pot.

Foodstuffs increasingly contain residues of chemical agents, such as pesticides, herbicides, synthetic fertilizers, hormones and the like, used in their production. Nutrition with so-called biologically grown foodstuffs can hardly be guaranteed in view of the rising world population. Therefore large amounts of such chemical agents will be necessary for the production of foodstuffs in the future as well. Regulations for maximum permissible concentrations of such chemical agents thus cannot keep pace with the increase in health consciousness of the populatin while usable foodstuffs are still supplied in adequate amounts.

The object of the present invention, therefore, is to provide a cooking utensil by means of which more allowance can be made for the demand for healthy nutrition.

This object is achieved according to the invention when the cooking utensil has an ion exchanger and/or absorber and/or absorber and/or filter and/or other device for the extraction of residues of pesticides, herbicides, synthetic fertilizers, hormones and the like from the products to be cooked and prepared, ie. from the foodstuffs to be prepared, their preparation liquid and/or their vapors during the cooking process.

Therefore, during the use of a cooking utensil designed according to the invention, the residues, considered to be harmful, of the chemical agents which were used during the production of the foodstuffs, are automatically extracted from the products to be cooked. However, the idea of the invention is not limited to this. If suitable ion exchangers, absorbers, adsorbers or filters are chosen, other components considered to be detrimental can also be extracted from the products to be cooked which by nature may contain them. The undesired components are preferably extracted from the liquid or vapor phase of the product to be cooked, ie. in particular from the preparation liquid if the product to be cooked does not consist solely of a liquid, as in the case of milk, or from the vapors of this liquid.

So that the extraction device can interact effectively with the liquid or vapor phase of the products to be cooked, it is preferably arranged in or on the lid, the side or the bottom in the form of a replaceable solid body, or of a container which is pervious to liquid and/or vapor. In this respect he solid body should have an effective surface area which is as large as possible, on account of porosity and the like. The replaceable arrangement is provided because, according to experience, the known ion exchangers, absorbers, adsorbers and/or filters are consumed and, after a certain period of use, have only a small efficiency. The liquid and/or vapor permeability of the container can be achieved, for example, by providing its side completely or at least in certain areas with passage openings, pores, capillary openings or the like, which assist or at least allow the passage of the liquid and/or the vapor, without the material of the ion exchanger, absorber, adsorber or filter being able to escape from the container. This embodiment is particularly suitable if the material of the ion exchanger, absorber, adsorber and/or filter is present in loose form, ie. for example as bulk material. If this material, however, has a solid shape, for example in the form of a porous stone or the like, the extraction device can be used as it is, even without a container. The only important point in this respect is that the material of the ion exchanger, absorber, adsorber and/or filter cannot mix with the foodstuffs, their preparation liquid or their vapors.

The extraction device can, for example, be constructed in the form of a circular, disk-shaped body or container which corresponds to the diameter of the bottom and which either can be placed loosely on the bottom of the cooking utensil or clamped to the adjacent side areas of the cooking utensil, so that it is held immovably in the cooking utensil especially when the products to be cooked are stirred or tipped out of the cooking utensil. Such an extraction device comes into direct contact with the liquid foodstuff or its preparation liquid.

According to a further embodiment of the inventive idea, the extraction device is constructed in the form of a body or container which is replaceably held on the lid and has a rigid or flexible side. Depending on how far the extraction device projects into the interior of the cooking utensil away from the lid, it interacts only with the vapor phase or also with the liquid phase of the products to be cooked. Mounting of the extraction device on the lid has the advantage that the corresponding cooking utensil can be used with and without the extraction device, if the lid constructed according to the invention is replaced by a customery cooking utensil lid.

The extraction device can also be constructed as a basket-like hook-in device which has appropriate hooks which engage over the upper edge of the cooking utensil. Here as well, depending on the length of these hooks, which can be adjusted if necessary, interaction with the vapor and/or liquid phase of the products to be cooked can be achieved.

Thus, as is already known in the case of decalcifiers for kettle water, the extraction device can also be constructed as an insertion element in the form of a cuboid, cylinder, sphere, bag or the like. The extraction device is then inserted into the cooking utensil as required and removed again.

Further objects, features, advantages and possible applications of the present invention will become apparent from the following description of exemplary embodiments with reference to the attached drawing. In this respect all the features described and/or grapically represented form in themselves or in any meaningful combination the subject of the present invention, even independently of their summary in the claims or back-references therein.

BRIEF DESCRIPTION OF THE FIGURES

In this drawing:

FIG. 1 shows schematically various embodiments of a cooking utensil showing the invention, with the arrangement of an extraction device in a cooking pot.

Figure 1A:
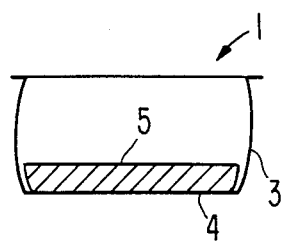
FIGS. 1a to 1c show various embodiments of a pot-like cooking utensil 1 (shown without a lid) which, according to the invention, has various types of devices for the extraction of residues of pesticides, herbicides, synthetic fertilizers, hormones and the like. They each utilized an ion exchanger and/or absorber and/or adsorber and/or filter for the harmful substances to be removed. According to FIG. 1a, the extraction device is constructed as a disk-shaped container 5 which, for example, has sides which are pervious to liquid and/or vapor on account of small openings and which contains the ion exchanger and/or absorber and/or adsorber and/or filter, for example in the form of a bulk material. The disk-shaped container 5 has a diameter which corresponds approximately to the internal diameter of the bottom 4 of the pot-like cooking utensil 1, on which bottom 4 of the container 5 is arranged, for example, fixed. According to FIG. 1b the extraction device is constructed as an approximately cylindrical upright body 6 which is connected to the bottom 4 of the cooking utensil 1 and which, for example, can also comprise a container with ion exchanger or the like inside it or can be constructed as a solid body. In the embodiment according to FIG. 1c the extraction device comprises a circular container 7 which is held on the internal surface of the side 3 of the pot-like cooking utensil 1.
Figure 1B:
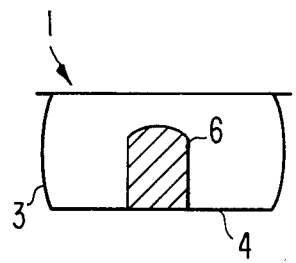
Figure 1C:
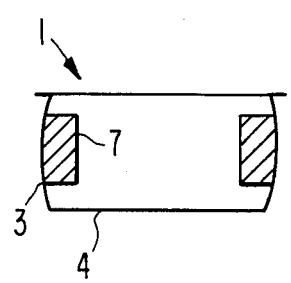
Figure 2A:
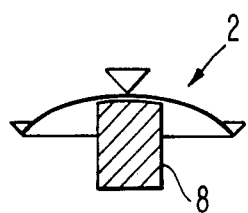
FIG. 2a shows an extraction device which, in the form of a hanging element 8, projects from the internal downward-facing surface of the utensil lid 2 into the interior of the cooking utensil and, if necessary, even into the liquid products to be cooked or into the preparation liquid of the products to be cooked, so that in this case too, as in particular in the embodiments according to FIGS. 1b and 1c, the extraction device interacts both with the liquid and the vapor phase of the products to be cooked. In the embodiment according to FIG. 2b the extraction device is constructed as a lid insert 9, the upper surface of which is adapted to the internal contour of the lid 2. According to FIG. 2c, a cartridge-shaped extraction device 10 is arranged at a certain distance beneath the lid 2 and fixed thereto.
Figure 2B:
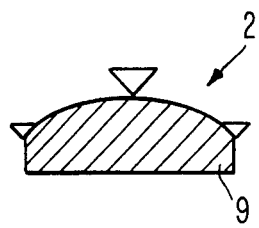
FIG. 2 shows schematically the arrangement of an extraction device according to the invention, on a cooking utensil lid.
Figure 2C:
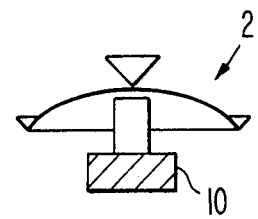
Figure 3A:
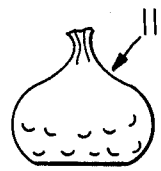
FIG. 3a shows an extraction device according to the invention, which is in the form of a bag and contains the ion exchanger or the like. This bag 11 can either be hung from the underside of the lid 2, in accordance with FIG. 2a or 2c, or can be placed inside the pot-like cooking utensil 1, as is also the case with, for example, the cylindrical or spherical insertion elements 13 and 14 according to FIGS. 3c and 3d. According to FIG. 3b, the extraction device is constructed as a hook-in device 12 which, in the manner of a basket, can be hung from the upper edge of the pot-like cooking utensil 1, by means of hooks, inside the pot-like cooking utensil 1.
Figure 3B:
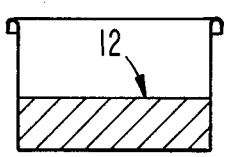
FIG. 3 shows various embodiments of an extraction device according to the invention which is intended for cooking utensils and is designed as an insertion element or hook-in device.
Figure 3C:
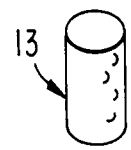
Figure 3D:
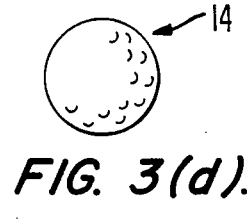

Of course, it is possible totthink of many other embodiments of a container or of a solid body, which can fulfil the purpose according to the invention. The extraction materials to be used, namely ion exchangers, absorbers, adsorbers, filters or similar devices can be chosen according to the substance to be extracted and their shape then adapted to the preferential purpose. Hence, for certain products which are to be cooked, it may be suitable to allow the extraction device to come into contact only with the liquid phase of the preparation liquid, whereas, for other products to be cooked, interaction with the vapors would appear to be most effective.

I claim:

1. A process for removing harmful residues from food during cooking comprising:
   placing food in a cooking pot having a lid, an extracting substance for extracting harmful residues selected from the group consisting of pesticides, herbicides, synthetic fertilizers, hormones and combinations thereof from liquids or a vapor phase and a fluid permeable means separating said food from said extracting substance
   heating said food to cook said food and drive said residues from said food into a preparation liquid or vapor formed from heating said food;
   said preparation liquid or vapor passing through said fluid permeable means to contact said extracting substance while said means maintains the separation of said food from said extracting substance;
   said extracting substance extracting said residues in situ from said preparation or vapor to purify said preparation liquid or vapor in contact with said food.

2. The process for removing residues as claimed in claim 1 wherein said extracting substance is selected from the group consisting of an ion exchanger, absorber or adsorber.

* * * * *